Dec. 19, 1933.  E. T. VINCENT  1,939,869
FUEL INJECTION APPARATUS
Filed Jan. 16, 1931    2 Sheets-Sheet 1
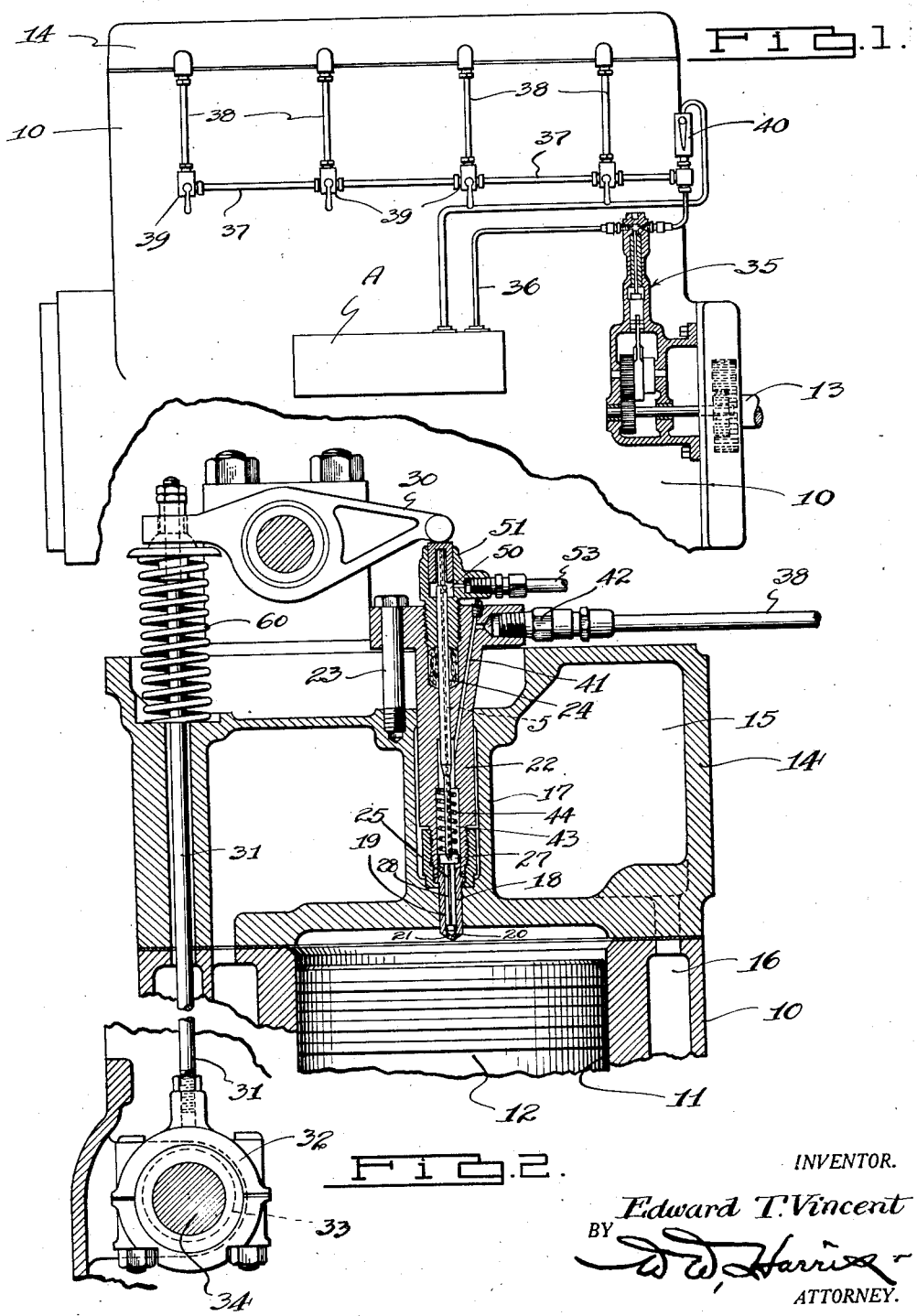
INVENTOR.
Edward T. Vincent
BY
ATTORNEY.

Dec. 19, 1933.　　　　E. T. VINCENT　　　1,939,869
FUEL INJECTION APPARATUS
Filed Jan. 16, 1931　　　2 Sheets-Sheet 2
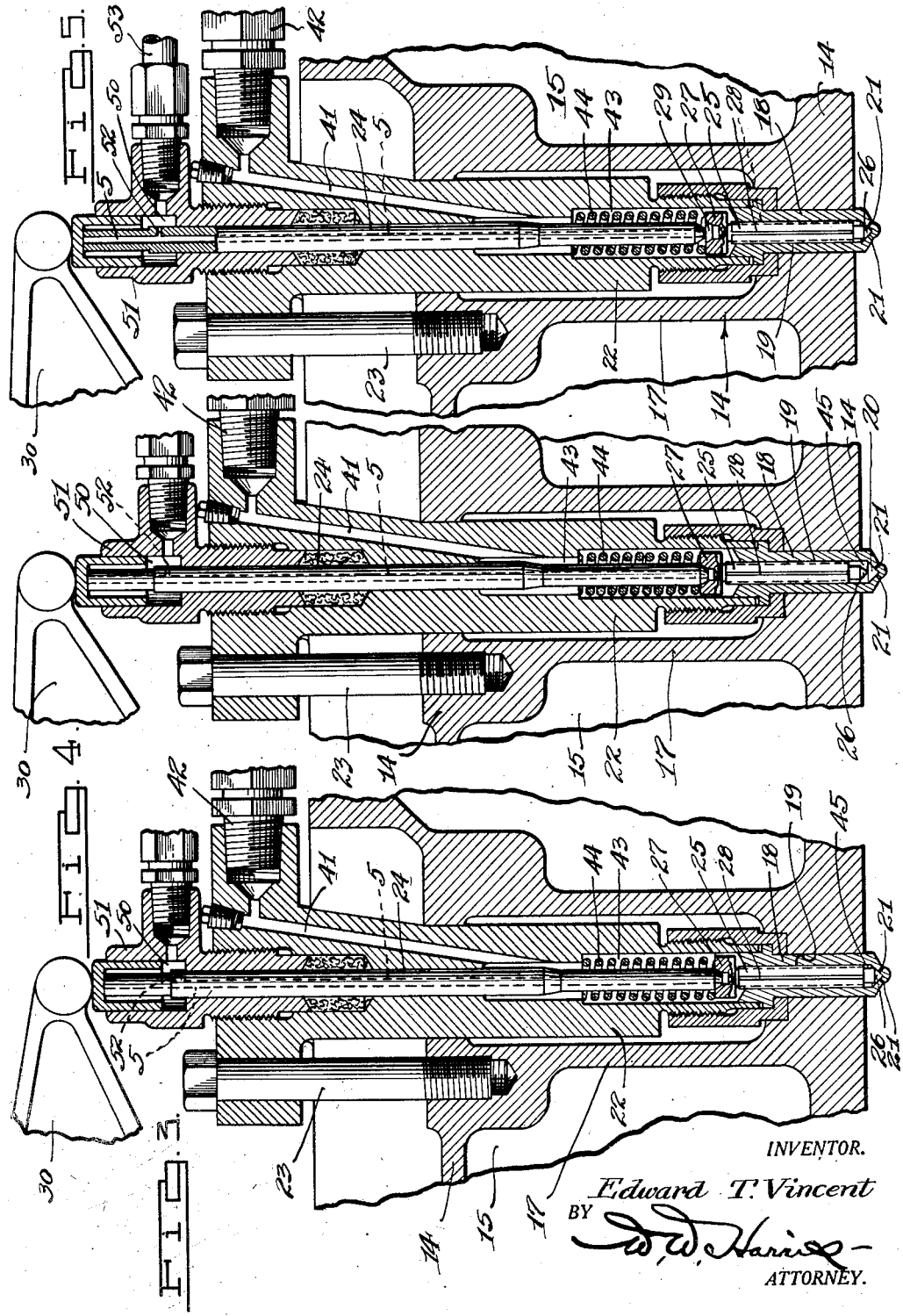
INVENTOR.
Edward T. Vincent
BY
ATTORNEY.

Patented Dec. 19, 1933

1,939,869

UNITED STATES PATENT OFFICE 1,939,869

FUEL INJECTION APPARATUS

Edward T. Vincent, Detroit, Mich., assignor to Continental Motors Corporation, Detroit, Mich., a corporation of Virginia Application January 16, 1931. Serial No. 509,146

19 Claims. (Cl. 299—107.5)

My invention relates to internal combustion engines of the compression ignition type in which atomized fuel is sprayed into the engine cylinder, and more particularly relates to the fuel injection means.

In this type of engine difficulty is sometimes experienced with the fuel injecting means in accurately obtaining a measured quantity of fuel because of the fact that the valve controlling the injection of the fuel does not close as promptly as it should. Furthermore, when the valve does not close promptly at the predetermined time, the additional fuel which is injected into the engine cylinder is in an unatomized condition which does not promote perfect combustion.

It is an object of my invention to construct a more efficient and reliable internal combustion engine of the compression ignition type by providing a novel fuel injection means which operates more efficiently and which is so actuated as to accurately control the quantities of fuel injected into the engine cylinders.

Another object of my invention is to construct an engine of the compression ignition type provided with a mechanically opened valve means controlling the injection of fuel into the engine cylinders and with means responsive to a predetermined fall of fuel pressure in the source of fuel supply for automatically closing said valve means when a predetermined charge of fuel has been injected into the cylinder.

A still further object of my invention is to provide an improved fuel injection means for an internal combustion engine of the compression ignition type having a mechanically opened and automatically closed valve means for controlling the injection of fuel into the engine cylinders by providing means for automatically venting the source of fuel pressure supply in communication with the fuel atomizing means for effecting a positive closing action to said valve means.

For a more detailed understanding of my invention, reference may be had to the accompanying drawings which illustrate one form which my invention may assume, and in which:

Figure 1 is a side elevational view of an internal combustion engine of the compression ignition type constructed in accordance with my invention, Figure 2 is a fragmentary transverse sectional view of the aforesaid engine showing the valve structure and actuating means therefor which controls the injection of the fuel into the engine cylinder, and Figures 3, 4, and 5 are fragmentary sectional views of the fuel injection means showing different positions of its operation.

An internal combustion engine of the compression ignition type may be constructed with any suitable engine block structure 10 having one or more cylinders 11 in which the pistons 12 are reciprocated, said pistons adapted to be connected in the usual way with the engine crankshaft 13. In the aforesaid type of engine, the fuel is sprayed into the cylinder where it ignites when coming into contact with the compressed air therein. The means for atomizing the fuel and the means controlling the injection of the fuel into the cylinder are preferably supported by the cylinder head 14 having suitable water jackets 15 communicating with the water jackets 16 about the cylinder 11.

The cylinder head illustrated in the accompanying drawings is preferably provided with a pillar 17 integrally formed with the cylinder head casting and arranged concentrically with respect to the cylinder axis, the pillar being bored out or otherwise constructed with a recess to receive the fuel nozzle and valve structure. The fuel nozzle 18 may be of any standard construction, the same having a central opening 19, a valve seat 20, and one or more openings 21 in the tip of the nozzle. A valve guide 22 is secured in the head by means of bolts 23 or other suitable means. The valve means is constructed of a pair of upper and lower valve elements 24 and 25 respectively, the lower valve element 25 provided with a valve portion 26 at its lower end, a bead or flange 27 at its upper end, and longitudinal or spiral grooves 28. The upper valve element 24 is guided directly in the valve guide and arranged to seat on the head 27 carried by the lower valve element.

The lower valve element 25 is preferably provided with beveled recessed seat 29 at its upper end for receiving the conical tip at the lower end of the valve element 24. The upper valve element 24 is provided with a longitudinally extending bore or opening 5, preferably located axially of the valve element and serving as a vent passage, the operation of which being hereinafter described.

The valve means is held on its seat by the pressure of the spring 60 acting through the rocker arm 30 which is engaged with the valve means. Means may be provided for positively actuating the rocker arm, but I have preferably devised a means for releasing the spring pressure from the rocker arm. This is preferably accomplished by compressing the spring by actuating the pull rod 31 through the agency of the eccentric strap and eccentric 32 and 33 respectively, said eccentric being keyed or otherwise secured to the camshaft 34.

The fuel is conducted to a pump 35, through a pipe or conduit 36 from a fuel tank A or other source of fuel supply and thence forced into a fuel supply line 37 or reservoir, commonly known as a "rail". Branch pipes or conduits 38 connect the "rail" with each of the cylinders, and if desired suitable valves 39 may be employed for respectively shutting off the supply of fuel to any one of said cylinders. A pressure regulating valve 40 may be employed to maintain a predetermined initial fuel pressure in the fuel line or "rail" at the beginning of the injection. I preferably connect the fuel pump with the engine mechanism in such a way as to actuate the pump to immediately bring the fuel pressure up to a predetermined maximum at the time of each jection. One or more strokes may be given to the pump, and one or or more pump cylinders may be employed, but preferably the pump is constructed so that each stroke of the pump will bring the fuel pressure up to the required amount so as to provide a predetermined constant pressure in the "rail" at the time of injection.

The branch pipes or conduits 38 are arranged to be connected with a passage 41 in the valve guide by a union 42 or other suitable fitting. The passage 41 communicates with an enlarged bore 43 within the valve guide, the bore 43 being slightly larger than the head of the lower valve element 25 to permit the fuel to flow freely past the head. A compression coil spring 44 bears on the head 27 yieldingly urging the lower valve element 25 on its seat. The fuel may flow through the groove or grooves 28 in the valve element 25 into the nozzle chamber 45 formed by the reduced end portion of the valve element 25.

Thus when the spring 60 is further compressed by the downward pull of rod 31, releasing the rocker arm, the fuel pressure may then lift the valve means, this pressure exerting a lifting force on the valve elements 24 and 25 greater than the forces tending to seat the valve means. Immediately on lifting the valve means, the fuel is sprayed into the cylinder under pressure, and the pressure of the fuel in the "rail" will rapidly fall, as well as the fuel pressure in the bore 43 that is in open communication with the "rail". When the fuel pressure falls a predetermined amount sufficient to allow the spring 44 to overcome the differential in pressure action on the valve element 25, the spring 44 will force the lower valve element 25 downwardly and separate the valve elements 24 and 25 substantially as described in my co-pending application Serial No. 479,836 filed September 5, 1930.

As soon as the valve elements are separated, the vent passage 5 is placed in open communication with the bore 43 and the pressure therein is relieved since the upper end of said passage communicates with a chamber 50 in the union or coupling 51 through which said upper valve element 24 extends, the said valve element being preferably provided with a hole 52 connecting said chamber with the vent passage. Said chamber 50 is arranged in open communication with the fuel tank A by means of a conduit or pipe 53. When the bore or chamber 43 is thus vented, the full force of the spring 44 may be utilized to quickly and positively seat the valve portion 26 on the valve seat 20, thereby shutting off the supply of fuel to the engine cylinder. It will be noted that there is no fuel pressure resisting the closing of the valve means because of the arrangement I have provided for venting the source of fuel pressure supply.

After the upper valve element is forced down and seated on the lower valve element by relieving the compression of spring 60, the fuel pressure is again built up as the vent is closed, and the valve is held seated until the spring 60 is again compressed releasing the downward pressure of the spring 60 on the valve means.

It will thus be noted that I have provided means for mechanically controlling the fluid pressure opening of the valve and for automatically closing the valve under fluid pressure. The amount of fuel injected in the cylinder may be readily varied by varying the fuel pressure in the "rail" or supply line at the beginning of the fuel injection period by means of the regulating valve 40. It may be further noted that it is not necessary to provide a finely adjusted mechanism for controlling the valve lift as the same is lifted the maximum amount at each operation of the fuel injection means, whatever the engine speed or load may be. Thus I have provided what may be termed as a constant stroke means timed with the engine for controlling the opening of the fuel injection valve and independent means regulating the quantity of fuel injected into the cylinder. A quick return of the rocker arm is not necessary as the valve is automatically closed independently of the valve opening mechanism.

The successful operation of an engine of the compression ignition type depends largely on the proper timing and control of the fuel injection and my construction is simple but very effective in providing such a control without frequent adjustment. Wear such as will materially effect the operation of an ordinary engine having a constant pressure fuel injection system, will not effect the operation of my engine.

It will be further noted that my construction is well adapted for use with an engine of the heavy oil compression ignition type as well as with engines employing light fuel oils or other fuel.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. Fuel injection means for an internal combustion engine of the compression ignition type and comprising fuel atomizing means, a source of fuel pressure supply communicating with said atomizing means, valve means associated with said atomizing means and adapted to be actuated by pressure of the fuel, yielding means acting on said valve means for urging the same closed, means to open said valve means, and means responsive to a predetermined fall of pressure in said fuel supply means for automatically venting same to effect closing of said valve means.

2. Fuel injection means for an internal combustion engine of the compression ignition type and comprising fuel atomizing means, a source of fuel pressure supply communicating with said atomizing means, valve means associated with said atomizing means and adapted to be actuated by pressure of the fuel, yielding means acting on said valve means for urging the same closed, mechanically actuated means acting on said valve means to positively hold the same closed and arranged to release the valve means at predetermined time intervals thereby permitting the same to open in response to the fuel pressure in said supply means, and means responsive to a predetermined fall of pressure in said fuel supply means for automatically venting same to effect closing of said valve means.

3. Fuel injection means for an internal combustion engine of the compression ignition type and comprising fuel atomizing means, valve means associated therewith and including relatively movable valve elements adapted to be actuated by fuel pressure, a source of fuel pressure supply communicating with said atomizing means, a vent adapted for communicating with said fuel supply means on relative movement of said valve elements, and means responsive to a predetermined fall of pressure in said fuel supply means for relatively moving said valve elements to vent said fuel supply means and close said valve means.

4. Fuel injection means for an internal combustion engine of the compression ignition type and comprising fuel atomizing means, valve means associated therewith and including relatively movable valve elements adapted to be actuated by fuel pressure, a source of fuel pressure supply communicating with said atomizing means, a vent extending longitudinally through one of said valve elements and adapted for communication with said fuel supply means on relative movement of the valve elements, and means responsive to a predetermined fall of pressure in said fuel supply means for relatively moving said valve elements to vent said fuel supply means and close said valve means.

5. Fuel injection means for an internal combustion engine of the compression ignition type and comprising fuel atomizing means, valve means associated therewith and including separable valve elements adapted for assembly end to end, said valve means adapted to be actuated by fuel pressure, a source of fuel pressure supply communicating with said atomizing means, a vent adapted for communication with fuel supply means on separation of said valve elements, and means responsive to a predetermined fall of pressure in said fuel supply means for separating said valve elements to vent said fuel supply means and close said valve means.

6. Fuel injection means for an internal combustion engine of the compression ignition type and comprising fuel atomizing means, valve means associated therewith and including separable valve elements having interengaging seats, said valve means adapted for actuation by fuel pressure, a source of fuel pressure supply communicating with said atomizing means, a vent extending longitudinally through one of said valve elements and intersecting the seat carried thereby, said vent adapted for communication with said fuel supply means on separation of said valve elements, and yielding means responsive to a predetermined fall of pressure in said fuel conducting means for separating said valve elements to vent said fuel supply means and close said valve means.

7. A fuel injection apparatus for engines of the fuel injection type comprising, valve means adapted to control injection of fuel to the engine, means conducting fuel under pressure to said valve means and tending to urge said valve means to open position, means controlling the opening of the valve means, and means for closing said valve means including means responsive to a fuel pressure drop in said fuel conducting means for relieving the pressure of the fuel on said valve means to facilitate valve operation.

8. A fuel injection apparatus for engines of the fuel injection type comprising, valve means adapted to control injection of fuel to the engine, means controlling the opening and closing of said valve means, means supplying fuel pressure to said valve means and tending to urge said valve means to open position, and means responsive to a full pressure drop in said fuel supplying means for relieving the pressure of the fuel on said valve means to facilitate valve operation.

9. A fuel injection apparatus for engines of the fuel injection type comprising, valve means adapted to control injection of fuel to the engine, means controlling the opening and closing of said valve means, means supplying fuel pressure to said valve means, said fuel pressure tending to urge said valve means to open position and means controlled by said valve means for relieving the pressure of the fuel on said valve means to facilitate valve operation.

10. A fuel injection apparatus for engines of the fuel injection type comprising, valve means adapted to control injection of fuel to the engine, means controlling the opening and closing of said valve means, means supplying fuel pressure to said valve means, said fuel pressure tending to urge said valve means to open position, said valve means having a vent adapted to communicate with the fuel at said valve means during closing of said valve means whereby to facilitate valve closing.

11. A fuel injection apparatus for engines of the fuel injection type comprising, valve means adapted to control injection of fuel to the engine, means conducting fuel under pressure to said valve means, means controlling the opening of the valve means, said fuel pressure tending to urge said valve means to open position and means for closing said valve means including means operated in response to a fuel pressure variation in said fuel conducting means for relieving the pressure of the fuel on said valve means to facilitate valve operation, said valve closing means including a spring acting on said valve means.

12. A fuel injection apparatus for engines of the fuel injection type comprising, valve means adapted to control injection of fuel to the engine, means controlling the opening and closing of said valve means, means supplying fuel pressure to said valve means, said fuel pressure tending to urge said valve means to open position and means responsive to a fuel pressure drop in said fuel pressure supply means for relieving the pressure of the fuel on said valve means to facilitate valve operation, and a spring tending to close said valve means.

13. A fuel injection apparatus for engines of the fuel injection type comprising, a member having an orifice for the passage of fuel to the engine, cooperating valve elements for opening and closing said orifice, means supplying fuel under pressure to said valve elements, said fuel pressure tending to urge said valve means to open position and means responsive to a fuel pressure drop in said fuel pressure supply means venting the fuel pressure to facilitate valve closing.

14. A fuel injection apparatus for engines of the fuel injection type comprising, a member having an orifice for the passage of fuel to the engine, valve means including cooperating valve elements for opening and closing said orifice, means supplying fuel under pressure to said valve elements, said fuel pressure tending to urge said valve means to open position and means responsive to separation of said valve elements for venting the fuel pressure to facilitate closing of said orifice by one of said valve elements.

15. A fuel injection apparatus for engines of the fuel injection type comprising, a member having an orifice for the passage of fuel to the engine, valve means including cooperating valve elements for opening and closing said orifice, means supplying fuel under pressure to said valve elements, said fuel pressure tending to urge said valve means to open position and means responsive to separation of said valve elements for venting the fuel pressure to facilitate closing of said orifice by one of said valve elements, and a spring acting on the last said valve element.

16. A fuel injection apparatus for engines of the fuel injection type comprising a valve adapted to control injection of fuel to the engine, means conducting fuel under pressure to said valve, said fuel pressure tending to open said valve when said valve is in its closed position, means responsive to engine operation for controlling the opening of said valve, means responsive to the drop in fuel pressure resulting from an opening movement of said valve for causing the fuel pressure to act on said valve to close said valve, and means venting the fuel pressure during closing of said valve.

17. A fuel injection apparatus of the character described comprising, orifice means, valve means therefor, fuel pressure means acting on the valve means and tending to urge said valve means to open position, and means responsive to a drop in the fuel pressure acting on said valve means for venting the fuel pressure at the valve means to facilitate the closing of said valve means.

18. A fuel injection apparatus of the character described comprising, orifice means, valve means therefor, fuel pressure means acting on the valve means and tending to urge said valve means to open position, means for closing said valve means, and means responsive to a drop in the fuel pressure acting on said valve means for relieving the fuel pressure at the valve means to facilitate closing of said valve means.

19. A fuel injection apparatus for compression ignition engines comprising, orifice means, valve means therefor, fuel pressure means acting on said valve means and tending to urge same to open position, means for causing said valve means to unseat in timed relation with the engine operation, means causing said valve means to seat, and means responsive to a drop in fuel pressure for relieving the fuel pressure at the valve during at least a portion of the seating movement of the valve means.

EDWARD T. VINCENT.